United States Patent [19]

Valenti

[11] 4,436,524

[45] Mar. 13, 1984

[54] AFTER TREATING COMPOSITION FOR DIRECT OR REACTIVE DYEINGS ON CELLULOSE

[75] Inventor: Salvatore Valenti, Binningen, Switzerland

[73] Assignee: Sandoz Ltd., Basel, Switzerland

[21] Appl. No.: 376,902

[22] Filed: May 10, 1982

[30] Foreign Application Priority Data

May 16, 1981 [DE] Fed. Rep. of Germany ....... 3119645
Jun. 19, 1981 [DE] Fed. Rep. of Germany ....... 3124195

[51] Int. Cl.$^3$ .............................................. D06P 5/02
[52] U.S. Cl. ............................................ 8/551; 8/496; 8/554; 8/918; 252/8.8; 252/301.21; 528/254; 528/259; 528/422; 528/423
[58] Field of Search ........................... 8/551, 554, 496; 528/422, 423, 254, 259; 252/8.8

[56] References Cited

U.S. PATENT DOCUMENTS

| | | | |
|---|---|---|---|
| 2,649,354 | 8/1953 | Hemmi et al. .......................... | 8/551 |
| 3,141,728 | 7/1964 | Bockmann et al. ..................... | 8/551 |
| 4,247,476 | 1/1981 | Haase et al. ........................... | 564/51 |
| 4,315,859 | 2/1982 | Nikles .................................... | 524/100 |
| 4,331,586 | 5/1982 | Hardy .................................... | 525/186 |

FOREIGN PATENT DOCUMENTS

| | | |
|---|---|---|
| 65169 | 11/1982 | European Pat. Off. . |
| 3113455 | 10/1982 | Fed. Rep. of Germany . |
| 1396195 | 6/1975 | United Kingdom . |
| 2006279 | 5/1979 | United Kingdom . |
| 2070006 | 9/1981 | United Kingdom . |
| 2098619 | 11/1982 | United Kingdom . |

*Primary Examiner*—A. Lionel Clingman
*Attorney, Agent, or Firm*—Gerald D. Sharkin; Richard E. Vila; Thomas C. Doyle

[57] ABSTRACT

The wet fastness properties of direct or reactive dyeings on cellulosic substrates are improved by aftertreatment with an agent comprising (A) a linear or crosslinked polymer comprising repeating units containing at least two quaternary nitrogen atoms linked by bridging groups connected to the quaternary nitrogen atoms by alkylene or arylene groups;

optionally (B) an N-methylol derivative of a urea, melamine, guanamine, triazinone, urone, carbamate or acid amide;

and, as an essential component, (C) a catalyst for the cross-linking of N-methylol compounds of the type (B) above, and subsequently carrying out a heat-curing step.

Certain of the quaternary polymers (A), containing melamine groups, are novel.

23 Claims, No Drawings

AFTER TREATING COMPOSITION FOR DIRECT OR REACTIVE DYEINGS ON CELLULOSE

This invention relates to an aftertreatment process for improving the fastness properties of dyes and optical brighteners on a hydroxy group-containing substrate.

The invention provides a process for improving the fastness properties of a dyestuff or optical brightener on a substrate comprising hydroxy group-containing fibres, by applying to the dyed, printed or brightened substrate an aftertreatment agent comprising (A) a linear or crosslinked polymer comprising repeating units containing at least two quaternary nitrogen atoms linked by bridging groups connected to the quaternary nitrogen atoms by alkylene or arylene groups;

optionally (B) an N-methylol derivative of a urea, melamine, guanamine, triazinone, urone, carbamate or acid amide;

and, as an essential component, (C) a catalyst for the cross-linking of N-methylol compounds of the type (B) above, and subsequently carrying out a heat-curing step.

The aftertreatment agent may comprise a mixture of (A) and (C); a mixture of (A), (B) and (C); a precondensate obtained by reacting (A) and (B) in the presence of (C); or a mixture of (C) and a precondensate obtained by reacting (A) and (B) in the absence of (C).

Where the aftertreatment agent comprises a mixture of two or more components, it is also possible to apply the components of the mixture to the substrate separately. For example, component (A) may be applied in one operation, followed by a mixture of (B) and (C) such as is conventionally used to give a crease resistant finish to cotton goods. Such variations are to be considered as within the process of the invention.

The aftertreatment agents are novel and form part of the present invention, as do the precondensates of components (A) and (B) and certain of the polymers (A) themselves.

The quaternary polymers (A) preferably contain repeating units of formula I $$\{W-X-W-X_1\}_r \qquad \text{I}$$

in which each
W independently is $$-\overset{R}{\underset{R}{N^{\oplus}}}-  \qquad (a)$$

$$-^{\oplus}N\underset{R}{\overset{\frown}{\diagdown}}\underset{\diagdown}{\overset{\diagup}{\diagup}}N^{\oplus}- \qquad (b)$$
$$\phantom{xxx}R$$

$$-^{\oplus}N\overset{\frown}{\diagdown}\underset{\diagdown}{\overset{\diagup}{\diagup}}N^{\oplus}- \text{ or} \qquad (c)$$

$$-^{\oplus}N\overset{\frown}{\diagdown}\underset{\diagdown}{\overset{\diagup}{\diagup}}N^{\oplus}- \qquad (d)$$

in which each

R, independently, is $C_{5-6}$cycloalkyl; $C_{1-20}$alkyl; $C_{1-20}$alkyl monosubstituted by —OH, —CN, $R_1O$—, $R_1S$—, $R_1CO$—, or —$CON(R_2)_2$; $C_{1-4}$alkyl monosubstituted by —COOH or arylsulphonyl or mono- or di-substituted by —$COOR_1$; phenyl or benzyl unsubstituted or substituted by up to 3 groups selected from $R_1$—, $R_1O$—, —OH, —CN, halogen and —COOH; or both groups R on a single nitrogen atom, together with the nitrogen atom to which they are attached, form a 5- or 6-membered ring;

$R_1$ is $C_{1-4}$alkyl;

$R_2$ is hydrogen, $C_{1-4}$alkyl, or $C_{1-4}$alkyl monosubstituted by —OH, aryl or $C_{1-4}$alkoxy;

$X_1$ is a divalent bridging group, and

X is $C_{2-12}$alkylene, unsubstituted or substituted by up to 3 —OH or —$OR_1$ groups; phenylene unsubstituted or substituted by up to 3 groups selected from halogen, —OH, —$R_1$, —$OR_1$ and $C_{1-4}$haloalkyl; or a group of formula $$-Y-Z-Y-$$

in which each

Y independently is arylene, aralkylene, alkarylene, oxyarylene or $C_{1-15}$alkylene, which may be interrupted by up to 7 oxygen or 3 quaternary nitrogen atoms and may be substituted by up to 3 —OH or —$OR_1$ groups, and Z is a bridging group of formula —NHCONH—, —$NHCOR_5CONH$—, —CONH—, —OCONH—, —COO—, —$COR_6CO$—, —$OCOR_7COO$—, —O-$CONHR_8NHCOO$—, or a group of formula (e) or (f)

(e) [triazine structure with $R_9$ groups]

(f) [triazine structure with $R_9$ groups]

in which $R_5$ is a direct bond, $C_{1-12}$alkylene, $C_{1-12}$alkylene interrupted by up to 3 N or O atoms, arylene, diaminoarylene or dioxyarylene, $R_6$ is $C_{1-12}$alkylene or $C_{2-12}$alkylene interrupted by up to 3 N, O or S atoms $R_7$ is arylene $R_8$ is $C_{1-12}$alkylene or arylene and each $R_9$ independently is hydrogen; $C_{1-20}$alkyl, unsubstituted or substituted by up to 3 hydroxy, $C_{1-4}$alkoxy or halogen groups, a group 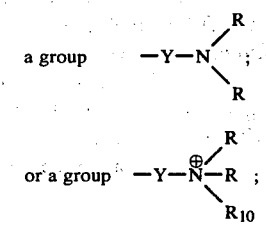

in which Y and R are as defined above and $R_{10}$ is $C_{1-20}$alkyl which may be unsubstituted or substituted by up to 3 hydroxy or halogen groups and/or may be interrupted by up to 3 —O—, —S—, —NR$_{11}$— or —N$^{\oplus}$(R$_1$)$_2$— groups, where $R_{11}$ is hydrogen or $C_{1-4}$alkyl and $R_1$ is $C_{1-4}$alkyl.

Polymers of formula I which contain melamine groups (e) or (f) are novel and constitute part of the present invention. Although the polymers are represented in formula I as being linear, it is to be understood that, when Z is a melamine group (e) or (f), chain branching may occur to a greater or lesser extent, and a cross-linked polymeric structure may be formed. In such case the group $R_9$ may also represent a direct bond to a further group Y, giving branched structures of the general type

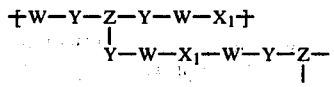 II

Branched or cross-linked polymers of this type also constitute part of the present invention.

In the polymers of the invention, any basic nitrogen atom which is not quaternised may be protonated by addition of an organic or inorganic acid. Such addition salts are also within the scope of the present invention. The cationic polymers will of course be associated with as many inorganic or organic anions as there are quaternary or protonated cationic sites on the molecule.

In polymers of formula I, the term halogen represents chlorine or bromine, preferably chlorine. Aryl is preferably phenyl and arylene is preferably m- or p-phenylene.

In the novel polymers containing a melamine group, W is preferably a group of formula (a) in which each R, independently, is $R_a$, where $R_a$ is $C_{1-20}$alkyl, unsubstituted or substituted by one phenyl, hydroxy or cyano group. More preferably R is $R_b$ where $R_b$ is $C_{1-4}$alkyl, particularly methyl.

$X_1$ is preferably $X_{1a}$ where $X_{1a}$ is

—$C_nH_{2n}$—, —CH$_2$O—R$_3$—OCH$_2$—, —CH$_2$(OR$_4$)$_p$OCH$_2$—,

-continued

—CH$_2$COCH$_2$—, —CH$_2$CHOHCH$_2$—,

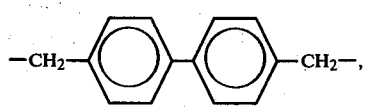

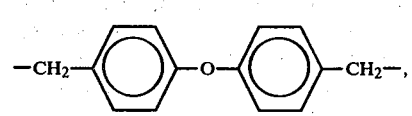

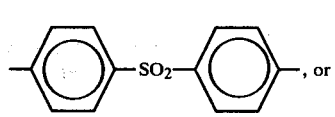, or

—CH$_2$CHOHCH$_2$$\displaystyle{+}$N$^{\oplus}$(R$_1$)$_2$.CH$_2$CHOHCH$_2$$\displaystyle{\cdot}{_x}$ in which $R_3$ is a straight chain or branched $C_{2-12}$alkylene group, unsubstituted or substituted with up to 3 halogen atoms, $R_4$ is —CH$_2$CH$_2$—, —CH$_2$—CH— or $\displaystyle{+}$CH$_2$$\displaystyle{\cdot}{_n}$
$\qquad\qquad\qquad$ |
$\qquad\qquad\qquad$ CH$_3$ n is 2 to 12, p is 2 to 15; and x is 1 to 5, preferably 2.

More preferably $X_1$ is $X_{1b}$ where $X_{1b}$ is $C_{2-10}$alkylene or —CH$_2$CHOHCH$_2$—.

Y is preferably $Y_a$ where $Y_a$ is $C_{2-5}$alkylene, which may be interrupted by one or two oxygen atoms; more preferably Y is —CH$_2$CH$_2$OCH$_2$—.

$R_9$ is preferably $R_{9a}$ where $R_{9a}$ is hydrogen, methyl, ethyl, —CH$_2$OH, —C$_2$H$_4$OH; —CH$_2$OCH$_3$ or a group —Y$_a$—N(R$_a$)$_2$ or —Y$_a$—N$^{\oplus}$(R$_a$)$_2$R$_{10a}$ in which $R_{10a}$ is $C_{1-20}$alkyl, unsubstituted or substituted by —OH and/or interrupted by —N$^{\oplus}$(R$_1$)$_2$—. More preferably $R_9$ is $R_{9b}$ where $R_{9b}$ is —CH$_2$OH, —CH$_2$OCH$_3$, —CH$_2$OCH$_2$CH$_2$—N(CH$_3$)$_2$ or —CH$_2$OCH$_2$CH$_2$N$^{\oplus}$(CH$_3$)$_2$CH$_2$.CHOHCH$_2$N$^{\oplus}$(CH$_3$)$_2$CH$_2$CH$_2$OH.

It is preferred that the polymer repeating group contains at least one N-methylol group, or an ether thereof.

Preferred melamine group-containing polymers contain repeating units of formula Ia

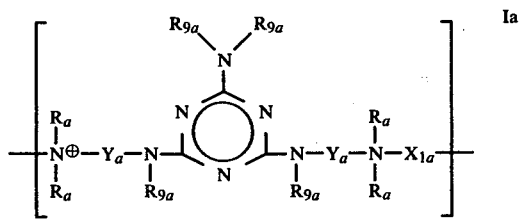

and more preferred are those containing repeating units of formula Ib

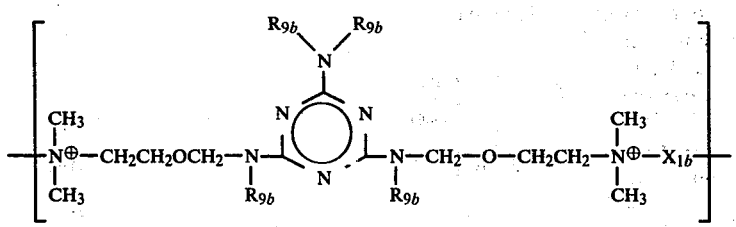

Particularly preferred are those containing repeating units of formula Ic or Id

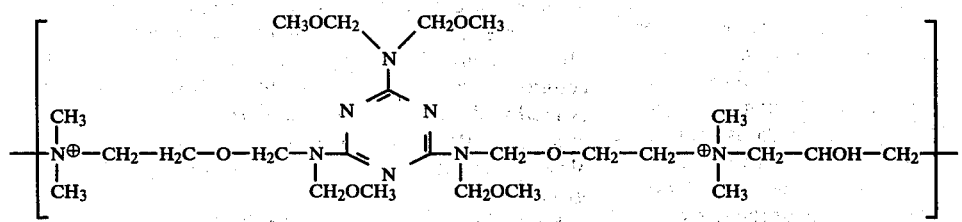

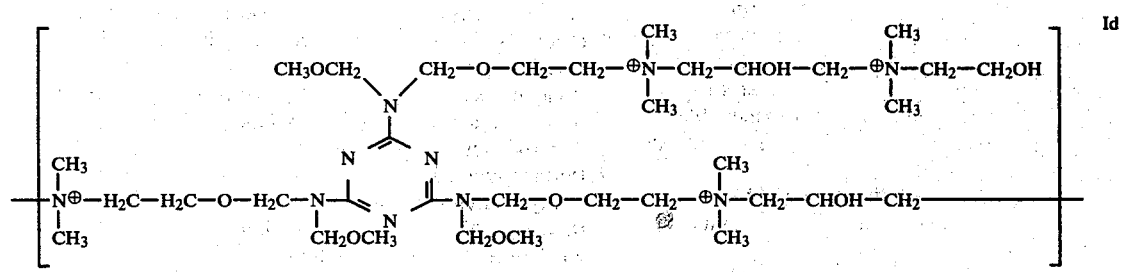

Polymers containing repeating units of formula I in which X is —Y—Z—Y— where Z is a melamine group of formula (e) or (f) may be prepared by the reaction of a compound of formula III $$Q-X_1-Q \qquad III$$

in which $X_1$ is as defined above and Q is a leaving group capable of forming an anion $A^\ominus$ with a compound of formula IV

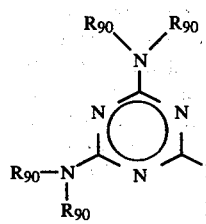

where each $R_{90}$, independently, is a group $R_9$ or a group

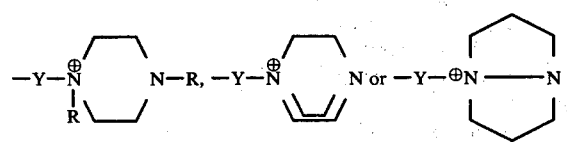

provided that at least two groups $R_{90}$ are groups containing a quaternizable nitrogen atom.

An alternative process is the reaction of a compound of formula V

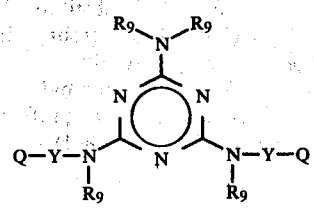

with a compound of formula VI-IX

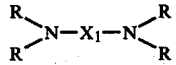 VI

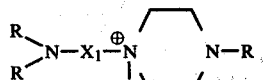 VII

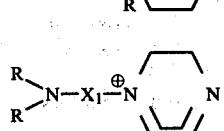 VIII

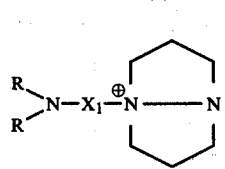 IX

These reactions may both be carried out in an inert solvent, for example an alcohol, glycol, ketone or cyclic ether. Suitable solvents include methanol, acetone, dioxan and tetrahydrofuran. The reaction temperature may be from room temperature to the boiling point of the solvent used, normally between 20° C. and 150° C., preferably 50°–100° C. It is also possible to carry out the reactions in the absence of solvent.

Preferred compounds of formula III are those in which Q is halogen, particularly 1,2-dibromomethane, 1,6-dibromohexane, 1,10-dibromodecane, p-bis(-chloromethyl)benzene, p,p'-bis(chloromethyl)biphenyl and 1,3-dichloropropan-2-ol. Other suitable dihalo compounds may be obtained by reaction of glycols or polyglycols with epichlorohydrin or by halomethylation reactions.

Melamine derivatives with tertiary amine groups such as those of formula IV may be prepared for example by the reaction of hexamethylolmelamine or an ether thereof with a dialkyl hydroxyalkylamine. Halogen-containing melamine compounds such as those of formula V where Q is halogen may be prepared in known manner, for example by reacting a methylolmelamine in a first step with a glycol and then reacting the free alcohol groups with epichlorohydrin.

The preferrred melamine-containing polymers having repeating units of formula I contain etherified N-methylol groups and have a primarily linear structure. They are either water-soluble or water-dispersible and have an average molecular weight between 1000 and 100000, preferably 2000–50000.

A further preferred group of polymers (A), having a repeating unit of formula I, does not contain a melamine ring in the repeating unit.

In such polymers, the group W is preferably a group of formula (a) in which each R, independently, is R' where R' is $C_{1-4}$-alkyl, unsubstituted or substituted by a hydroxy, $C_{1-4}$alkoxy or —CON $[R_{12}]_2$ group where $[R_{12}]$ is hydrogen, $C_{1-4}$alkyl,$C_{1-4}$hydroxyalkyl or $(C_{1-4}$alkoxy$)C_{1-4}$alkyl. More preferably R is methyl.

$X_1$ is preferably $X_{1a}$ stated above, more preferably $X_1'$, where $X_1'$ is $C_{2-12}$alkylene, —CH$_2$COCH$_2$—,

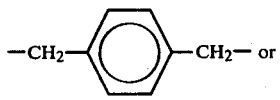

or

X is preferably X' where X' is $C_{2-12}$alkylene or —Y'—Z'—Y'— where Y' is $C_{2-12}$alkylene and Z' is —NHCONH— or —NHCO—Y'—CONH—. More preferably, X is X" where X" is —(CH$_2$)$_y$—NHCONH(CH$_2$)$_y$— where each y, independently is 2–4, preferably 3.

Preferred polymers of this type contain repeating units of formula I'

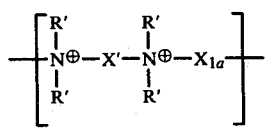

and more preferred polymers contain repeating units of formula I"

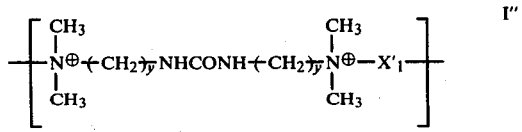

Polymers of this type are known and may be prepared as described in U.S. Pat. No. 4 247 476.

The N-methylol derivatives which constitute component (B) of the aftertreatment agents of the present invention are generally those N-methylol compounds which are known as crosslinking agents for cellulose fibres, and are used to impart a crease-resistant finish to cellulose fabrics. The compounds may contain free N-methylol groups >N—CH$_2$OH, or these may be etherified. Preferred ether derivatives are the lower alkyl ethers having 1 to 4 carbon atoms in the alkyl groups.

Examples of suitable N-methylol compounds are N,N'-dimethylolurea, N,N'-dimethylolurea dimethyl ether, N,N'-tetramethylolacetylenediurea, N,N'-dimethylolpropyleneurea, 4,5-dihydroxy-N,N'-dimethylolethyleneurea, 4,5-dihydroxy-N,N'-dimethylolethyleneurea dimethyl ether, N,N'-dimethylol-5-hydroxypropyleneurea, N,N'-dimethylol-4-methoxy-5,5-dimethylpropyleneurea, N,N'-dimethylolethyleneurea, methoxymethylmelamine, dimethylolalkandioldiurethanes, N,N'-dimethylol-5-alkylhexahydro-1,3,5-triazin-2-ones, N,N'-dimethylolurone and dimethylolcarbamates. These compounds can be used either alone or as mixtures.

Particularly suitable are hydrolysis-resistant reactive resin precursors, for example N,N'-dimethylol-4,5-dihydroxy- or 4,5-dimethoxy-ethyleneurea, N,N'-dimethylol-4-methoxy-5,5-dimethylpropyleneurea and N,N'-dimethylol carbamates, optionally in etherified form. Preferred ether forms are the methyl and ethyl ether derivatives.

Suitable catalysts (C) include the nitrates, sulphates, chlorides, tetrafluoroborates and dihydrogen orthophosphates of aluminium, magnesium and zinc as well as aluminium hydroxychloride, zirconyl oxychloride and mixtures of any of these. These catalysts may also be used in the form of mixtures with water soluble, inorganic salts, particularly with alkali metal sulphates or alkaline earth salts, preferably chlorides. Particularly preferred are sodium or potassium sulphate and calcium chloride. They may also be used in the form of mixtures with organic acids such as citric acid. Other suitable catalysts are (a) alkali metal bisulphites
(b) amine hydrochlorides, for example 2-amino-2-methylpropanol hydrochloride
(c) organic acids, for example citric, oxalic, maleic, glycollic and trichloroacetic acids
(d) inorganic acids, for example phosphoric and hydrochloric acids, alone or together with salts for example ammonium or calcium chloride,
and
(e) ammonium salts of inorganic acids, for example ammonium nitrate, chloride, sulphate and oxalate, and mono- and di-ammonium orthophosphate.

Mixtures of any of these catalysts may be used.

Preferred catalysts are the nitrates, sulphates, chlorides and dihydrogen orthophosphates of aluminium, magnesium or zinc, more preferably of magnesium, particularly magnesium chloride, optionally together with an alkali metal sulphate, particularly sodium sulphate. The choice of the optimum catalyst system will however depend primarily upon the nature of the textile substrate and of component (B), if present, and the man skilled in the art will be aware from numerous publications which catalyst systems are preferred for specific resin precursors and substrates.

The invention further provides a precondensate which is the reaction product of a cationic polymer (A) and an N-methylol compound (B), as defined above. By a precondensate is meant a reaction product which remains water-soluble and non-gelled, and is capable of further reaction with hydroxyl group-containing fibres on heat-curing. The precondensate may be prepared by reacting together (A) and (B) in aqueous medium, preferably with constant stirring, at temperatures from room temperature to 100° C., preferably 50°–100° C., more preferably 60°–70° C. The reaction is stopped before the reaction product becomes insoluble or forms a gel; suitable reaction times are of the order of 30 minutes to 3 hours. Preferably component (A) is added portionwise to stirred component (B) at 60°–70° C.

The reaction between (A) and (B) may take place in the presence of the catalyst (C); alternatively (C) may be added after (A) and (B) have been reacted together. When it is present during the reaction it is preferably dissolved in component (B) before (A) is added.

The ratio of A:B in such a precondensate is suitably in the range 1:0.625–20, more preferably 1:1.75–7.5.

The invention further provides an aftertreatment agent for a dyed, printed or brightened substrate comprising a cationic polymer (A), a catalyst (C) and, optionally, an N-methylol compound (B). When the polymer (A) does not contain N-methylol groups, as for example the non-melamine containing polymers of formula I', it is preferred that an N-methylol compound (B) is present. When component (B) is present, it is preferably in the form of a precondensate with component (A). The ratios of the three components (A):(B):(C), when all three are present, are preferably within the range 1:0.625–20:0.25–4 for the melamine-containing polymers (A), or the range 1:0.625–20:0.025–6 for the other polymers (A). More preferably, in each case, the ratios are 1:1.75–7.5:0.25–1.5. All ratios are weight ratios based on the dry weight of active material. Where component (B) is absent, correspondingly smaller amounts of catalyst (C) may be used.

The hydroxy group-containing substrate is preferably a cellulosic fibrous substrate comprising natural or regenerated cellulose, particularly cotton and viscose rayon, alone or mixed with synthetic fibres. The substrate may be dyed, printed or brightened by any conventional methods, for example dyeing or brightening may be carried out by exhaust methods or by padding followed by thermofixation or cold dwell fixation or, in the case of reactive dyes, by alkaline fixation. The process according to the invention is particularly suitable for reactive and direct dyestuffs, of which metal complex direct dyestuffs, especially copper complex dyes, are preferred.

The process according to the invention is carried out upon a substrate on which the dyeing or printing process including any necessary fixation step, has been completed. The substrate may be dry, or may still be damp, provided that it is not so wet that it is incapable of further pick-up. The aftertreatment agent according to the invention is applied to the substrate in aqueous solution by dipping, spraying, foam application, padding or other conventional application techniques. The preferred application method is by padding at room temperature.

The quantities in which the product according to the invention is applied to the substrate depend largely upon the depth of the dyeing which is to be fixed. For direct dyeings of 1/1 standard depth on cotton the quantities used are 30–200 g/l of the padding liquor when applied at a pick-up of 70–100% of the dry weight of the goods. Preferably the quantity is 70–140 g/l for cotton, in order to obtain a wash-resistant improvement in wet fastness together with adequate crease resistance, and 100–200 g/l for regenerated cellulose. For application to mixtures of cellulose fibres and synthetic fibres, the quantity to be applied is calculated on the basis of the cellulose content of the substrate.

The padding liquor may contain further auxiliaries such as stiffening agents, softening agents, agents to improve the rubbing or breaking strength, soil-release products, hydrophobic agents and others provided that these are capable of forming stable aqueous solutions when mixed with the product according to the invention.

After application of the padding liquor, the substrate is subjected to a heat curing step such as is conventional for resin treatment based on compounds of type (B). The substrate may for example be dried at 70°–120° C. and finally cross-linked at a temperature of 130°–180° C. for 2 to 8 minutes, or alternatively simultaneously dried and cross-linked by heat treatment at 100°–200° C., preferably 140°–180° C. for 5 seconds to 8 minutes depending on the temperature. A preferred process involves heating the padded substrate to 170°–180° C. for 30 seconds to 1 minute.

Particularly suitable direct dyestuffs for use with the process of the invention are the following:

C.I. Direct Red 80, 83, 84, 92, 95, 207, 211, 218;
C.I. Direct Yellow 39, 50, 98, 106, 129;
C.I. Direct Violet 47, 66, 95;
C.I. Direct Blue 71, 77, 79, 80, 85, 90, 94, 98, 217, 251;
C.I. Direct Green 27, 31, 65, 67;
C.I. Direct Brown 103, 111, 113, 116, 220;
C.I. Direct Black 62, 117, 118;

and particularly suitable reactive dyes are
C.I. Reactive Violet 23,
C.I. Reactive Blue 23
and
C.I. Reactive Blue 79.

Dyeings and printings with direct dyestuffs often show inadequate wash fastness. The dyestuff which is bound to the surface of the cellulose fibres is largely removed from the fibres by repeated washings, and bleeding of the dyestuff into the wash liquid can cause partial readsorption onto undyed cellulose material.

There have been many attempts to overcome these disadvantages, for example by complexing on the fibre with metal salts, formation of the dyestuff on the fibre, treatment of the dyestuff and/or the fibre with formaldehyde, impregnation with artificial resins and aftertreatment with cationic auxiliaries. The use of cationic after-treatment auxiliaries has proved particularly effective.

The disadvantage of all previously used methods is that although improved fastness is indeed attained, the results are only temporary. Even in the case of cationic after-treatment, the auxiliary is removed from the fibres by repeated washings, particularly under alkaline conditions and at high temperatures such as 50°–100° C. The loss of the cationic auxiliary means that the dyeing loses its improved wet fastness again.

It was hoped to solve the wet fastness problem by the use of reactive dyes, which form a chemical bond to the fibre. However, a disadvantage of the use of reactive dyes is that although the dyestuff which is chemically bound to the fibre has excellent wash fastness, the goods must be washed thoroughly after dyeing in order to remove residual unfixed dyestuff, which has poor wash fastness.

Treatment of dyed cellulose substrates according to the invention gives improved wet fastness properties, particularly fastness to washing, including washing under alkaline conditions at temperatures of 40°–90° C., particularly at 60° C. and above. For example, repeated 30 minute 60° C. washings with a wash liquor containing 5 g/l soap and 2 g/l soda at a goods to liquor ratio of 1:50 are readily withstood.

In the case of dyeings with reactive dyes, the wash fastness of the unfixed dye may be raised to approximately the same level as that of the fixed dye, thereby eliminating the need to remove the unfixed dye.

At the same time a resin finish is imparted to the cellulose fibres which gives reduced swelling in aqueous or alkaline media and hence more rapid drying, improved dimensional stability and higher crease resistance. Light fastness properties are also improved, particularly for dyeings which are light in tone, and particularly when the polymeric component (A) contains melamine groups.

The following Examples, in which all parts and percentages are by weight and all temperatures in degrees Centigrade, illustrate the invention.

EXAMPLE 1

(a) 156 Parts hexamethoxymethylmelamine (1 mole) and 100 parts 2-dimethylaminoethanol hydrochloride (2 moles) are treated with 1 part formic acid, and the mixture is heated to 120°–130° C. under stirring in a nitrogen atomsphere. The reaction is continued until 25–26 parts methanol have been distilled off. The reaction mixture is cooled and treated with a methanolic solution of 32 parts sodium hydroxide. The mixture is suction filtered.

(b) The filtrate from (a) above is treated with 120 parts 1,10-dibromodecane (1 mole) and refluxed for 2–3 hours. The resulting clear solution, containing 45% active solids in methanol, has a viscosity of 30 cp at 20° (rotation viscometer). It is concentrated by evaporation under vacuum, giving a water-dispersible resin containing cationic units of formula The aqueous dispersion, after addition of a catalyst e.g. magnesium chloride and optionally dimethyloldihydroxyethyleneurea, can be used as an aftertreatment agent for direct dyeings on cotton.

EXAMPLES 2–8

Example 1 is repeated, using in place of 1,10-dibromodecane the reagents listed in Table 1, in the amounts shown. Cationic polymers are obtained in which the corresponding group derived from the dihalo compound by removal of both halogens replaces $-CH_2)_{10}$ in the formula of Example 1.

TABLE 1

| Example No. | Reagent | Quantity (parts by weight) |
|---|---|---|
| 2 | $Br{-}(CH_2)_6{-}Br$ | 195 |
| 3 | $ClCH_2{-}\bigcirc{-}\bigcirc{-}CH_2Cl$ | 200 |
| 4 | $ClCH_2{-}\bigcirc{-}CH_2Cl$ | 140 |
| 5 | $ClCH_2{-}CO{-}CH_2Cl$ | 100 |
| 6 | $BrCH_2CH_2Br$ | 150 |
| 7 | $ClCH_2.CHOH.CH_2Cl$ | 103 |
| 8 | $[ClCH_2.CHOH.CH_2.\overset{\oplus}{N}(CH_3)_2.CH_2]_2 CHOH$ | 323 |

The reagent in Example 8 is obtained by reaction of 2 moles of dimethylamine with 1 mole HCl and 3 moles epichlorohydrin. The product of Example 7, as a 42% solution in methanol, has a viscosity of 24 cp at 20°.

The products of Examples 2–8, after addition of $MgCl_2$ and optionally dimethyloldihydroxyethyleneurea, can be used as aftertreatment agents for direct dyeings on cotton.

EXAMPLE 9

To a stirred mixture of 25 parts melamine and 35 parts of an aqueous 35% formaldehyde solution is added within 45 minutes 50 parts of a 50% aqueous solution of dimethylamine. The temperature rises to 40°–45°. The mixture is stirred for 1 hour at 65°–70° and the resulting suspension is concentrated by removal of water under vacuum. The product has the formula:

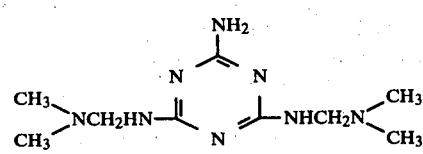

10.3 Parts of this product are dissolved in 500 parts by volume of methanol and treated with 12.8 parts 1,10-dibromodecane. The solution is stirred under reflux for

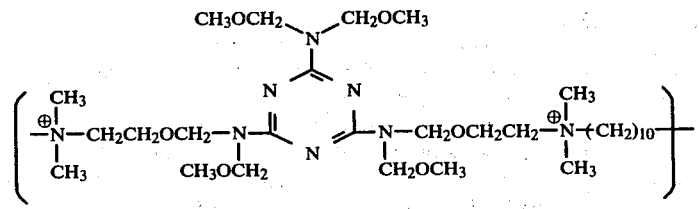

24 hours, and when the reaction is complete (as determined by Br⁻ analysis), the solvent is removed under vacuum. A cationic polymer having a repeating unit of formula is treated with 64 parts NaOH in methanol. The filtrate, containing 40% active solids in methanol, has a viscosity of 22 cp at 20°. It is treated with 103 parts (2 moles) 1,3-dichloropropan-2-ol as in Example 10. The product contains cationic repeating units of formula

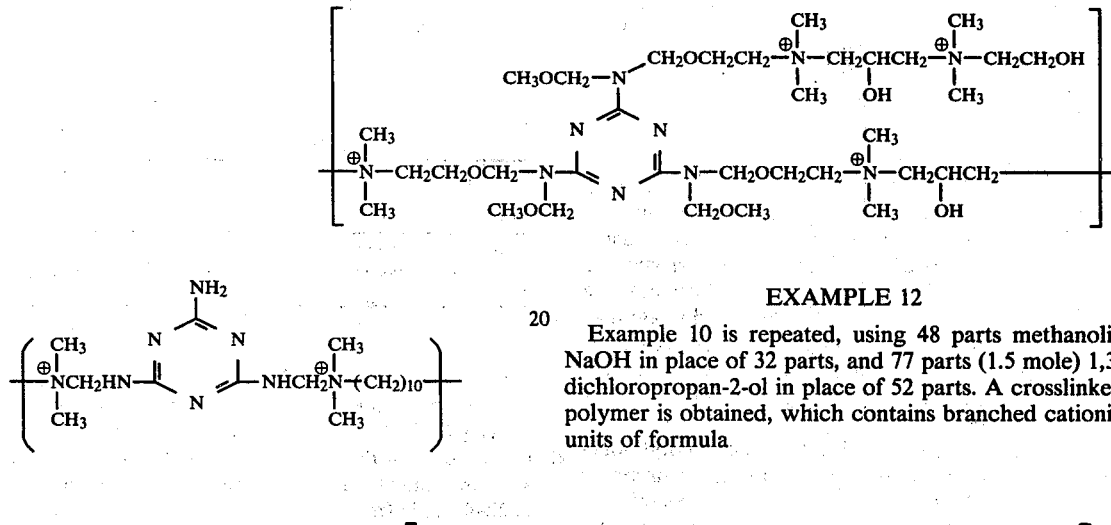

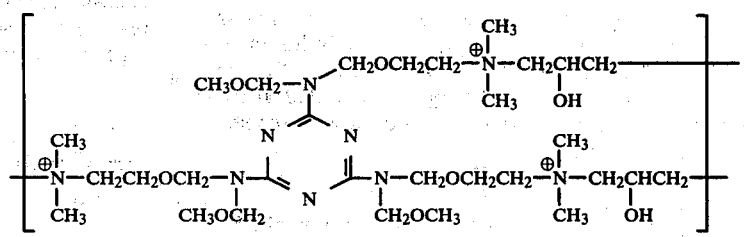

is obtained. This product can be N-methylolated by reaction with formaldehyde in known manner, and can be used as the products of Example 1–8.

EXAMPLE 10

Example 1a is repeated, using 150 parts (3 moles) dimethylaminoethanol hydrochloride instead of 2 moles, and distilling off 38–39 parts methanol. The filtrate is treated with 52 parts (1 mole) 1,3-dichloropropan-2-ol, refluxed for 4 hours and the solvent removed under vacuum to give a water-dispersible resin containing cationic units of formula as well as linear cationic units of the formula shown in Example 10.

EXAMPLE 13

390 Parts hexamethoxymethylmelamine are mixed with 124 parts ethylene glycol and 4 parts p-toluenesulphonic acid, and heated to 120°–130° while stirring under nitrogen. The reaction is complete when 64 parts methanol have distilled over. The reaction mixture is cooled to 80°–90° and 4.5 parts stannic chloride added, then 185 parts epichlorohydrin are added dropwise over 16 hours. Stirring is continued at this temperature for 24 hours.

EXAMPLE 12

Example 10 is repeated, using 48 parts methanolic NaOH in place of 32 parts, and 77 parts (1.5 mole) 1,3-dichloropropan-2-ol in place of 52 parts. A crosslinked polymer is obtained, which contains branched cationic units of formula

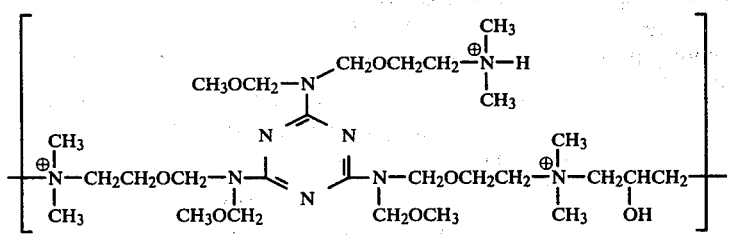

EXAMPLE 11

Example 10 is repeated using 200 parts (4 moles) dimethylaminoethanol HCl instead of 2 moles. 38–39 Parts methanol are distilled off, and the cooled product 63.5 Parts of this condensation product are dissolved in methanol, treated with 11.6 parts 1,2-bis(dimethylamino)ethane, refluxed for 24 hours and the solvent removed under vacuum. The product contains repeating units of formula

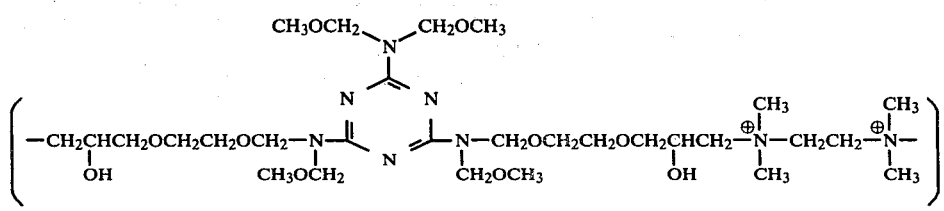

EXAMPLE 14

20 Parts of the product of Example 1 are dissolved with stirring in 100 parts of a 50% aqueous solution of dimethyloldihydroxyethyleneurea. The pH is adjusted to 7, then 10 parts $MgCl_2 \cdot 6H_2O$ are added with stirring, and the mixture is finally stirred for 30–45 minutes at 60°–70°, then cooled. The resulting precondensate may be used as an aftertreatment agent for direct dyeings on cotton.

EXAMPLE 15

Equimolar quantities of p,p'-bischloromethylbiphenyl and 1,3-bis-(3-dimethylaminopropyl)urea (prepared by elimination of ammonia from 1-dimethylamino-3-aminopropan and urea) are refluxed together in methanol (200 ml for 0.2 molar quantities) for 24 hours. The viscosity of the mixture gradually increases. After completion of the reaction the mixture is cooled and the solvent removed in vacuum. A product with repeating units of formula X

in which n=3 and

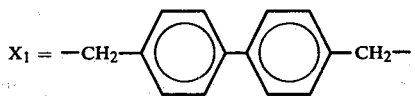

is obtained.

After addition of a catalyst, e.g. magnesium chloride, and preferably an N-methylol compound, the product can be used as an aftertreatment agent for direct dyeings on cotton.

EXAMPLES 16-20

Repeating Example 15 but using equimolar quantities of 1,3-bis—3-dimethylaminopropyl)urea or 1,3-bis—2-dimethylaminoethyl)urea with the bis halogen compound indicated in Table 2, polymers with repeating units of formula X in which n and $X_1$ are as shown in Table 2 are obtained.

TABLE 2

| Example No. | reagent | n | $X_1$ |
|---|---|---|---|
| 16 | p-di(chloromethyl)benzene | 3 | —CH$_2$—⟨◯⟩—CH$_2$— |
| 17 | 1,3-dichloroacetone | 3 | —CH$_2$COCH$_2$— |
| 18 | 1,10-dibromodecane | 3 | —(CH$_2$)$_{10}$— |
| 19 | 1,6-dibromohexane | 3 | —(CH$_2$)$_6$— |

TABLE 2-continued

| Example No. | reagent | n | $X_1$ |
|---|---|---|---|
| 20 | p,p'-bischloromethylbiphenyl | 2 | —CH$_2$—⟨◯⟩—⟨◯⟩—CH$_2$— |

EXAMPLE 21

Equimolar quantities of 1,6-dibromohexane and $(CH_3)_2N(CH_2)_3NHCO(CH_2)_4CONH(CH_2)_3N(CH_3)_2$, prepared from diethyl adipate and 1-dimethylamino-3-aminopropane by analogy with J. Amer. Chem. Soc. 73 5822–4(1951) (m.p. 114°–115° from chlorobenzene) are reacted as described in Example 15. A polymer with repeating units of formula

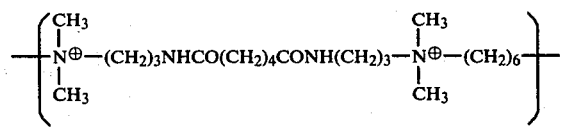

is obtained.

EXAMPLES 22-27

Example 15 is repeated using the reagents indicated in Table 3.

TABLE 3

| | Molar quantities of reagents | | | | |
|---|---|---|---|---|---|
| Example No. | 22 | 23 | 24 | 25 | 26 |
| Reagent | | | | | |
| p,p'-bischloromethylbiphenyl | 2 | 2 | 1 | 2 | 1 |
| tetramethylethylenediamine | 1 | — | — | — | — |
| 1,3-bis(3-dimethylaminopropylurea | 1 | 1 | 2 | 1 | 1 |
| tetramethylhexylenediamine | — | 1 | — | — | — |
| 1,6-dibromohexane | — | — | 1 | — | 1 |
| $(CH_3)_2N(CH_2)_3N(CH_2CH_2CONH_2)_2$ from acrylamide and 3-dimethylamino-1-aminopropane | — | — | — | 1 | — |
| tetramethylpropylenediamine | — | — | — | — | 1 |

The product of Example 25 is further methylolated with formaldehyde, to give the product of Example 27.

Application Examples

EXAMPLE 28

A 1/1 standard depth dyeing of C.I. Direct Blue 90 on cotton fabric is padded to 80% pickup with a solution containing 30 g/l of the product of Example 1 and 15 g/l $MgCl_2 \cdot 6H_2O$. The goods are then shock dried on a tension frame at 175°–180°, so that the curing time of the dried fabric is about 30–45 seconds. The fixed dyeing has good wash-fastness properties, which are retained after repeated 60° washings, and even a wash at the boil.

Similar results are obtained using the products of Examples 2–13. If the treatment solution also contains 50 g/l dimethyloldihydroxyethyleneurea, an equally good fixation is obtained together with improved crease resistance. The same good combination of properties is obtained by using the precondensate of Example 14.

EXAMPLE 29

A rinsed, dried exhaust dyeing of C.I. Direct Red 80 (1/1 standard depth) on a cotton fabric is padded at 80% pickup with a solution containing 25 g/l of the product of Example 15, 50 g/l dimethyloldihydroxyethyleneurea, 15 g/l $MgCl_2.6H_2O$ and adjusted to pH 4 with acetic acid.

The substrate is heat-treated as in Example 28, giving a fixed dyeing with good wash fastness properties. The products of Examples 16–27 may be used in the same way.

EXAMPLE 30

A cotton fabric is dyed in an exhaust bath with C.I. Reactive Violet 23 (1/1 standard depth), the final washing being omitted. After the dyeing step the substrate is rinsed briefly and dried, then padded with a solution as described in Example 29. The substrate is dried to a residual moisture of 2–4%, then cured for 60 seconds at 180°. The resulting dyeing has a high wash fastness in spite of omission of the normal washing step, and at the same time has improved crease-resistance.

What is claimed is:

1. A composition useful as an aftertreatment agent for improving the fastness of a dyeing, printing or optical brightening on a hydroxy group-containing fibrous substrate which composition comprises
   (1) a mixture of (A) and (C),
   (2) a mixture of (A), (B) and (C),
   (3) a precondensate prepared by reacting (A) with (B) in the presence of (C), or
   (4) a mixture of (C) and a precondensate prepared by reacting (A) with (B) in the absence of (C),
wherein
   (A) is a linear or crosslinked polymer comprising repeating units of the formula I″ or I‴,
   (B) is an N-methylol derivative of a urea, melamine, guanamine, triazinone, urone, carbamate or acid amide;
and
   (C) is a catalyst for the cross-linking of N-methylol compounds of the type (B) above,
with the proviso that in the composition of type (1) component (A) comprises repeating units of formula I‴, said formulae I″ and I‴ being as follows:

$$\left[ \begin{array}{c} CH_3 \\ | \\ -N^{\oplus}-(CH_2)_{\overline{3}}NHCONH-(CH_2)_{\overline{3}}N^{\oplus}-X'_1- \\ | \\ CH_3 \end{array} \begin{array}{c} CH_3 \\ | \\ \\ | \\ CH_3 \end{array} \right] \quad I''$$

wherein $X_1'$ is $C_{2-12}$alkylene, $-CH_2COCH_2-$, $-CH_2-\langle\bigcirc\rangle-CH_2-$ or $-CH_2-\langle\bigcirc\rangle-\langle\bigcirc\rangle-CH_2-$ and each y, independently, is 2–4, and $-(-W-Y-Z-Y-W-X_1-)-$  I‴ in which each W independently is (a)
$$\begin{array}{c} R \\ | \\ -N^{\oplus}- \\ | \\ R \end{array}$$

(b)
$-{}^{\oplus}N\underset{R}{\overset{R}{\diagup}}\boxed{\phantom{xx}}\underset{}{\overset{}{\diagdown}}N^{\oplus}-$ (c)
$-{}^{\oplus}N\boxed{\phantom{xx}}N^{\oplus}-$ or (d)
$-{}^{\oplus}N\boxed{\phantom{xx}}N^{\oplus}-$ in which each
R, independently, is $C_{5-6}$cycloalkyl; $C_{1-20}$alkyl; $C_{1-20}$alkyl monosubstituted by —OH, —CN, $R_1O-$, $R_1S-$, $R_1CO-$, or $-CON(R_2)_2$; $C_{1-4}$alkyl monosubstituted by —COOH or arylsulphonyl or mono- or di-substituted by —COOR$_1$; phenyl or benzyl unsubstituted or substituted by up to 3 groups selected from $R_1-$, $R_1O-$, —OH, —CN, halogen and —COOH; or both groups R on a single nitrogen atom, together with the nitrogen atom to which they are attached, form a 5- or 6-membered ring;
$R_1$ is $C_{1-4}$alkyl;
$R_2$ is hydrogen, $C_{1-4}$alkyl or $C_{1-4}$alkyl monosubstituted by —OH, aryl or $C_{1-4}$alkoxy;
$X_1$ is a divalent bridging group,
each
Y, independently, is arylene, aralkylene, alkarylene, oxyarylene or $C_{1-15}$alkylene, which may be interrupted by up to 7 oxygen or 3 quaternary nitrogen atoms and may be substituted by up to 3 —OH or —OR$_1$ groups,
and
Z is a bridging group of formula (e) or (f)

(e)
$$\begin{array}{c} R_9\diagdown_{\phantom{x}}\diagup R_9 \\ N \\ | \\ \underset{N}{\diagup}\overset{N}{\diagdown} \\ -N\underset{|}{\phantom{x}}\overset{|}{\phantom{x}}N- \\ R_9 \quad\quad R_9 \end{array}$$

-continued $$\text{(f)} \quad \begin{array}{c} R_9 \quad R_9 \\ \diagdown N \diagup \\ | \\ \text{triazine ring with } N\text{-}R_9 \text{ and } -N-R_9 \text{ substituents} \end{array}$$

in which
- $R_5$ is a direct bond, $C_{1-12}$alkylene, $C_{1-12}$alkylene interrupted by up to 3 N or O atoms, arylene, diaminoarylene or dioxyarylene,
- $R_6$ is $C_{1-12}$alkylene or $C_{2-12}$alkylene interrupted by up to 3 N, O or S atoms,
- $R_7$ is arylene,
- $R_8$ is $C_{1-12}$alkylene or arylene, and each
- $R_9$ independently is hydrogen, $C_{1-20}$alkyl, unsubstituted or substituted by up to 3 hydroxy, $C_{1-4}$alkoxy or halogen groups, a group $-Y-N\diagup^R_{\diagdown R}$ ;

or a group $-Y-\overset{\oplus}{N}\diagup^R_{\diagdown R_{10}}$ ;

in which Y and R are as defined above and $R_{10}$ is $C_{1-20}$ alkyl which may be unsubstituted or substituted by up to 3 hydroxy or halogen groups and/or may be interrupted by up to 3 —O—, —S—, —NR$_{11}$— or —N$\oplus$(R$_1$)$_2$— groups, where $R_{11}$ is hydrogen or $C_{1-4}$ alkyl.

2. A composition according to claim 1 wherein component (A) comprises repeating units of formula I''.

3. A composition according to claim 1 wherein component (A) comprises repeating units of formula I'''.

4. A composition according to claim 3 wherein component (A) contains N-methylol groups or ethers thereof.

5. A composition according to claim 1 wherein component (B) is selected from the group consisting of N,N'-dimethylol-4,5-dihydroxyethyleneurea, N,N'-dimethylol-4,5-dimethoxyethyleneurea, N,N'-dimethylol-4-methoxy-5,5-dimethylpropyleneurea, N,N'-dimethylol carbamates and the methyl and ethyl ethers of said compounds.

6. A composition according to claim 2 wherein component (B) is selected from the group consisting of N,N'-dimethylol-4,5-dihydroxyethyleneurea, N,N'-dimethylol-4,5-dimethoxyethyleneurea, N,N'-dimethylol-4-methoxy-5,5-dimethylpropyleneurea, N,N'-dimethylol carbamates and the methyl and ethyl ethers of said compounds.

7. A composition according to claim 3, wherein (A) contains repeating units of formula Ia $$\text{(Ia)} \quad \left[ \begin{array}{c} R_{9a} \quad R_{9a} \\ \diagdown N \diagup \\ \text{triazine ring} \\ R_a \quad R_a \quad R_a \quad R_a \\ | \quad | \quad | \quad | \\ -N^\oplus-Y_a-N- \quad -N-Y_a-N-X_{1a}- \\ | \quad | \quad | \quad | \\ R_a \quad R_{9a} \quad R_{9a} \quad R_a \end{array} \right]$$

in which
- $R_a$ is $C_{1-20}$alkyl, unsubstituted or substituted by one phenyl, hydroxy or cyano group,
- $Y_a$ is $C_{2-5}$alkylene interrupted by one or two oxygen atoms,
- $R_{9a}$ is hydrogen, methyl, ethyl, —CH$_2$OH, —C$_2$H$_4$OH; —CH$_2$OCH$_3$ or a group $Y_a$—N(R$_a$)$_2$ or $Y_a$—N$^+$(R$_a$)$_2$R$_{10a}$ in which $R_{10a}$ is $C_{1-20}$alkyl, unsubstituted or substituted by —OH;

and
$X_{1a}$ is

—C$_n$H$_{2n}$, —CH$_2$O—R$_3$—OCH$_2$—, —CH$_2$(OR$_4$)$_p$OCH$_2$—,

—CH$_2$COCH$_2$—, —CH$_2$CHOHCH$_2$—,

—CH$_2$—⟨phenyl⟩—CH$_2$—,

—CH$_2$—⟨biphenyl⟩—CH$_2$—,

—CH$_2$—⟨phenyl⟩—O—⟨phenyl⟩—CH$_2$—,

—⟨phenyl⟩—SO$_2$—⟨phenyl⟩—, or

—CH$_2$CHOHCH$_2$—[—N$^\oplus$(R$_1$)$_2$·CH$_2$CHOHCH$_2$—]$_x$ in which
- $R_3$ is a straight chain or branched $C_{2-12}$alkylene group, unsubstituted or substituted with up to 3 halogen atoms,
- $R_4$ is —CH$_2$CH$_2$—, —CH$_2$—CH— or —(CH$_2$)$_x$—
                      |
                     CH$_3$ n is 2 to 12, p is 2 to 15; and x is 1 to 5.

8. A composition according to claim 1 wherein component (B) is selected from the group consisting of N,N'-dimethylolurea, N,N'-tetramethylolacetylenediurea, N,N'-dimethylolpropyleneurea, 4,5-dihydroxy-N,N'-dimethylolethyleneurea, N,N'-dimethylol-5-hydroxypropyleneurea, N,N'-dimethylol-4-methoxy-5,5-dimethylpropyleneurea, N,N'-dimethylolethyleneurea, methylolmelamine, dimethylolalkandioldiurethanes, N,N'-dimethylol-5-alkylhexahydro-1,3,5- triazin-2-ones, N,N'-dimethylolurone, N,N'-dimethylolcarbamates, the $C_{1-4}$alkyl ethers of said compounds and mixtures thereof.

9. A composition according to claim 8 wherein catalyst (C) is selected from the group consisting of the nitrates, sulphates, chlorides, tetrafluoroborates and dihydrogen orthophosphates of aluminium, magnesium and zinc, aluminium hydroxychloride, zirconyl oxychloride and mixtures thereof.

10. A composition according to claim 1 comprising a precondensate of (A) and (B) together with catalyst (C).

11. A composition according to claim 10 comprising a precondensate of (A) and (B) reacted in the presence of catalyst (C).

12. A composition according to claim 1 comprising a mixture of components (A), (B) and (C).

13. A composition according to claim 2 wherein component (B) is selected from the group consisting of N,N'-dimethylolurea, N,N'-tetramethylolacetylenediurea, N,N'-dimethylolpropyleneurea, 4,5-dihydroxy-N,N'-dimethylolethyleneurea, N,N'-dimethylol-5-hydroxypropyleneurea, N,N'-dimethylol-4-methoxy-5,5-dimethylpropyleneurea, N,N'-dimethylolethyleneurea, methylolmelamine, dimethylolalkandioldiurethanes, N,N'-dimethylol-5-alkylhexahydro-1,3,5-triazin-2-ones, N,N'-dimethylolurone, N,N'-dimethylolcarbamates, the $C_{1-4}$alkyl ethers of said compounds and mixtures thereof and catalyst (C) is selected from the group consisting of the nitrates, sulphates, chlorides, tetrafluoroborates and dihydrogen orthophosphates of aluminium, magnesium and zinc, aluminium hydroxychloride, zirconyl oxychloride and mixtures thereof.

14. A composition according to claim 1 containing component (B), where component (B) is N,N'-dimethylol-4,5-dihydroxyethylene urea.

15. A composition according to claim 1 in which catalyst (C) is magnesium chloride.

16. A composition according to claim 4 wherein catalyst (C) is selected from the group consisting of the nitrates, sulphates, chlorides, tetrafluoroborates and dihydrogen orthophosphates of aluminium, magnesium and zinc, aluminium hydroxychloride, zirconyl oxychloride and mixtures thereof.

17. A composition according to claim 3 comprising component (A) together with catalyst (C).

18. A method for improving the fastness properties of a dyestuff or optical brightener on a substrate comprising hydroxy group-containing fibers, which method comprises applying to such a substrate dyed, printed or brightened with a dyestuff or optical brightener a composition according to claim 1 and heat curing the thus-treated substrate.

19. A method for improving the fastness properties of a dyestuff or optical brightener on a substrate comprising hydroxy group-containing fibers, which method comprises applying to such a substrate dyed, printed or brightened with a dyestuff or optical brightener a composition according to claim 13 and heat curing the thus-treated substrate.

20. A composition according to claim 7 wherein component (B) is selected from the group consisting of N,N'-dimethylol-4,5-dihydroxyethyleneurea, N,N'-dimethylol-4,5-dimethoxyethyleneurea, N,N'-dimethylol-4-methoxy-5,5-dimethylpropyleneurea, N,N'-dimethylol carbamates and the methyl and ethyl ethers of said compounds.

21. A composition according to claim 7 wherein (A) contains repeating units of the formula 22. A composition according to claim 7 wherein (A) contains repeating units of the formula 23. A composition according to claim 3 wherein (A) contains repeating units of the formula

* * * * *